(12) United States Patent
Mochizuki et al.

(10) Patent No.: US 6,169,755 B1
(45) Date of Patent: Jan. 2, 2001

(54) LASER-DIODE-PUMPED SOLID STATE LASER AND AN OPTICAL SYSTEM USING THE SAME

(75) Inventors: Manabu Mochizuki; Yutaka Murakami, both of Yamanashi-ken (JP)

(73) Assignee: Pioneer Electronic Corporation, Yamanashi-ken (JP)

( * ) Notice: Under 35 U.S.C. 154(b), the term of this patent shall be extended for 0 days.

(21) Appl. No.: 09/116,941

(22) Filed: Jul. 17, 1998

(30) Foreign Application Priority Data

Jul. 29, 1997 (JP) .................................................. 9-217970

(51) Int. Cl.[7] .......................................................... H01S 3/10
(52) U.S. Cl. .................................................. 372/21; 372/22
(58) Field of Search .................................................. 372/21

(56) References Cited

U.S. PATENT DOCUMENTS 5,197,073 * 3/1993 Oka ......................................... 372/22
5,978,392 * 11/1999 Adachi ................................... 372/21

* cited by examiner

*Primary Examiner*—Frank G. Font
*Assistant Examiner*—Armando Rodriguez
(74) *Attorney, Agent, or Firm*—Arent Fox Kintner Plotkin & Kahn PLLC

(57) ABSTRACT

A laser-diode-pumped solid state laser comprises: a solid laser medium; a laser-diode capable of producing a laser beam for exciting the solid laser medium; a pair of mirrors which forms a resonator for resonating a light excited by the solid laser medium. An interval between the pair of mirrors is determined such that a gain width GW of the solid laser medium and a frequency interval FS (between every two resonator modes) satisfies an equation $0.1 \leq FS/GW < 1$.

9 Claims, 5 Drawing Sheets

LASER-DIODE-PUMPED SOLID STATE LASER AND AN OPTICAL SYSTEM USING THE SAME

BACKGROUND OF THE INVENTION

The present invention relates to a laser-diode-pumped solid state laser and an optical system using the same.

There has been known a laser-diode-pumped solid state laser in which a solid laser crystal is axially excited by a laser beam emitted from a laser-diode, and an infrared laser beam is oscillated by an resonator constructed in an axial direction.

Such laser-diode-pumped solid state laser is compact in size, has a long useful life, capable of oscillating with a single longitudinal mode, and can perform a high frequency modulation.

Usually, a laser-diode for producing a laser beam has an output of 100 mW or more to produce a laser beam having a wavelength of 808–810 nm, which is absorbable by a solid laser crystal. On the other hand, a solid laser crystal is a YAG (Yttrium Aluminium Garnet) containing a certain amount of rear earth element such as Nd (Neodymium).

In practice, with a laser-diode-pumped solid state laser, it is required that a laser beam emitted from a laser-diode be absorbed by a solid laser crystal with a high efficiency.

A laser-diode capable of giving a highest output can produce a laser beam having a wavelength of 800 nm. Since $Nd^{3+}$ (Neodymium) can absorb a light having a wavelength near 800 nm, an oxide crystal containing Nd has been widely used to serve as a solid laser crystal.

However, in order to use a single longitudinal mode to effect an oscillation so as to obtain a laser beam having a stabilized oscillation frequency and containing only a low noise, it is required that a frequency interval (between every two resonator modes) be large, thus requiring a solid laser crystal to be made with a small thickness.

On the other hand, if a solid laser crystal is made to have only a small thickness, a light amount passing through the solid laser crystal will be increased, resulting in a problem that only a small amount of light can be absorbed by the solid laser crystal. As a result, it is impossible to effectively obtain an infrared laser beam from the beams emitted from the laser-diode.

SUMMARY OF THE INVENTION

It is an object of the present invention to provide an improved laser-diode-pumped solid state laser and an optical system using the same, which is capable of effectively absorbing a laser beam emitted from a laser-diode, and producing an infrared laser beam with a high efficiency, so as to solve the above-mentioned problems peculiar to the above-mentioned prior arts.

According to the present invention, there is provided a laser-diode-pumped solid state laser, comprising: a solid laser medium; a laser-diode capable of producing a laser beam for exciting the solid laser medium; a pair of mirrors which forms a resonator for resonating a light excited by the solid laser medium. In particular, an interval between the pair of mirrors is determined such that a gain width GW of the solid laser medium and a frequency interval FS (between every two resonator modes) satisfies an equation $0.1 \leq FS/GW < 1$.

In one aspect of the invention, the pair of mirrors are formed by a pair of mutually facing reflective films disposed on both sides of the solid laser medium.

In another aspect of the invention, the solid laser medium is either $YVO_4$ crystal (yttrium vanadium oxide) containing Nd, or YAG crystal (Yttrium Aluminium Garnet) containing Nd.

In further aspect of the invention, the solid laser medium, the laser-diode and the pair of mirrors are mounted on an identical thermally conductive support means. Further, a temperature control device is provided for controlling the temperature of the thermally conductive support means.

In a still further aspect of the invention, the solid laser medium, the laser-diode and the pair of mirrors are enclosed within a case having a window formed on one side thereof, which side emitting a light beam excited by the solid laser medium. In addition, the case has polarization elements or wavelength plates provided adjacent to said window.

According to the present invention, there is also provided an optical system, comprising: a first laser light source and a second laser light source, capable of producing laser beams having mutually orthogonal polarization planes; a beam splitter capable of synthesizing together the laser beams emitted from the first and second laser light sources; an optical means for converging a synthesized laser beam from the beam splitter and directing the same to an optical fiber. In particular, each of the first and second laser light sources is a laser-diode excitable solid laser, which includes a solid laser medium; a laser-diode capable of producing a laser beam for exciting the solid laser medium; a pair of mirrors which forms a resonator for resonating a light excited by the solid laser medium. Further, an interval between the pair of mirrors is determined such that a gain width GW of the solid laser medium and a frequency interval FS (between every two resonator modes) satisfies an equation $0.1 \leq FS/GW < 1$. Moreover, a distance between the beam waist of a laser beam of the first laser light source and the beam splitter before the laser beam is incident on the converging lens, is equal to a distance between the beam waist of a laser beam of the second laser light source and the beam splitter before the laser beam is incident on the converging lens.

The above objects and features of the present invention will become better understood from the following description with reference to the accompanying drawings.

DETAILED DESCRIPTION OF THE PREFERRED EMBODIMENTS

Figure 1:
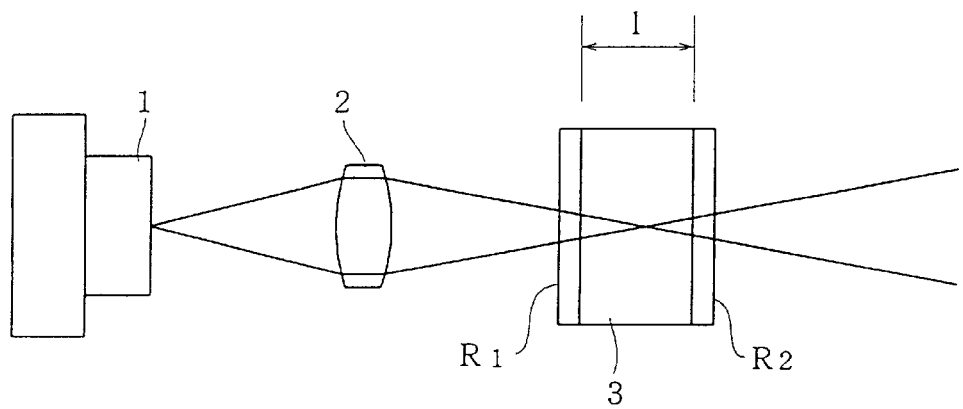
FIG. 1 is an explanatory view indicating a laser-diode-pumped solid state laser according to an embodiment of the present invention.

FIG. 1 shows a laser-diode-pumped solid state laser constructed in accordance with one embodiment of the present invention. In FIG. 1, reference numeral 1 is a laser-diode capable of producing a laser beam having a wavelength of 808 nm. Reference numeral 2 is a converging lens capable of converging a laser beam emitted from the laser diode 1. Reference numeral 3 is a solid laser medium comprising either $YVO_4$ crystal (yttrium vanadium oxide) containing Nd or YAG crystal (Yttrium Aluminium Garnet) containing Nd.

On an incident side of the solid laser medium 3 is provided a mirror R1 comprising a dichroic mirror which can completely absorb a laser beam having a wavelength of 808 nm, but completely reflect an oscillation light beam having a wavelength of 1340 nm. On an output side of the solid laser medium 3 is provided a mirror R2 comprising a reflecting mirror which can transmit 1–10% of an oscillation light (wavelength: 1340 nm) but reflect the remainder of the oscillation light.

In fact, the mirror R1 and the mirror R2 together form a resonator.

Figure 2:
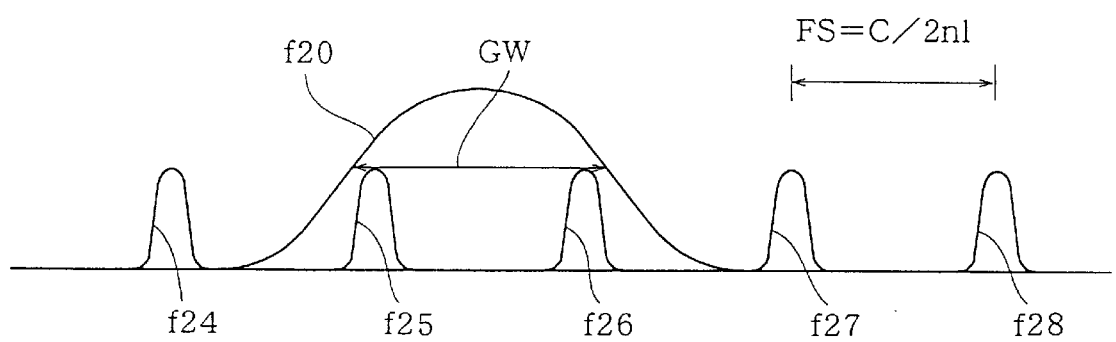
FIG. 2 is a graph indicating a relationship between a laser beam frequency and a gain width GW of a solid laser medium, and showing a frequency interval FS (between every two resonator modes).

FIG. 2 is a graph indicating a relationship among a laser beam frequency, a gain width GW of the solid laser medium 3, and resonator modes. In FIG. 2, f20 indicates a relationship between a gain of the solid laser medium 3 and a laser beam frequency, GW indicates a gain width of the solid laser medium, f24–f28 indicate various resonator modes. Frequency interval FS means a frequency interval between every two adjacent resonator modes, it may be represented by an equation FS=C/2nl wherein C is light velocity, n is an index of refraction of the solid laser medium, l is the length of the resonator.

In general, when a frequency interval FS is larger than a gain width GW of a solid laser medium, a laser-diode-pumped solid state laser can oscillate with a single longitudinal mode. However, in the present invention, the length of a resonator (i.e., the thickness of a solid laser medium) is selected such that a relationship between the gain width GW of a solid laser medium and a frequency interval FS satisfy an equation $0.1 \leq FS/GW < 1$. At this moment, the number of longitudinal modes is 2–11. In this way, by properly setting a length of the resonator, a level of a laser noise may be minimized so as to effectively obtain an infrared laser light from a laser beam emitted from the laser-diode 1.

The following description will be given to explain the reasons as to why a relationship between the gain width GW of a solid laser medium and a frequency interval FS should satisfy an equation $0.1 \leq FS/GW < 1$.

Namely, a solid laser medium (Nd:$YVO_4$), which is capable of obtaining an oscillation light having a wavelength of 1340 nm, has a higher absorptance of absorbing a laser beam emitted from a laser-diode than other kinds of crystals (for instance, its light absorptance is about 3 times as high as that of YAG). In order to obtain a single longitudinal mode, it is necessary that the thickness of a solid laser medium be made as small as 0.2 mm. But, a process of treating a crystal to obtain such a small thickness is proved to be difficult. Moreover, if an Nd doping amount is 1 atom %, only 30% of the laser beam emitted from the laser-diode can be absorbed by the solid laser medium, hence resulting in a low efficiency in oscillating an infrared laser beam.

In fact, an absorptance of absorbing a laser beam emitted from a laser-diode is affected by an Nd doping amount and the thickness of a solid laser medium. To obtain a light absorptance of 99%, a product of (an Nd doping amount)×(a solid laser medium thickness) is required to be 3 atm %.mm or more. On the other hand, to obtain a light absorptance of 85%, a product of (an Nd doping amount)×(a solid laser medium thickness) is required to be at least 1.2 atm %.mm.

Figure 3:
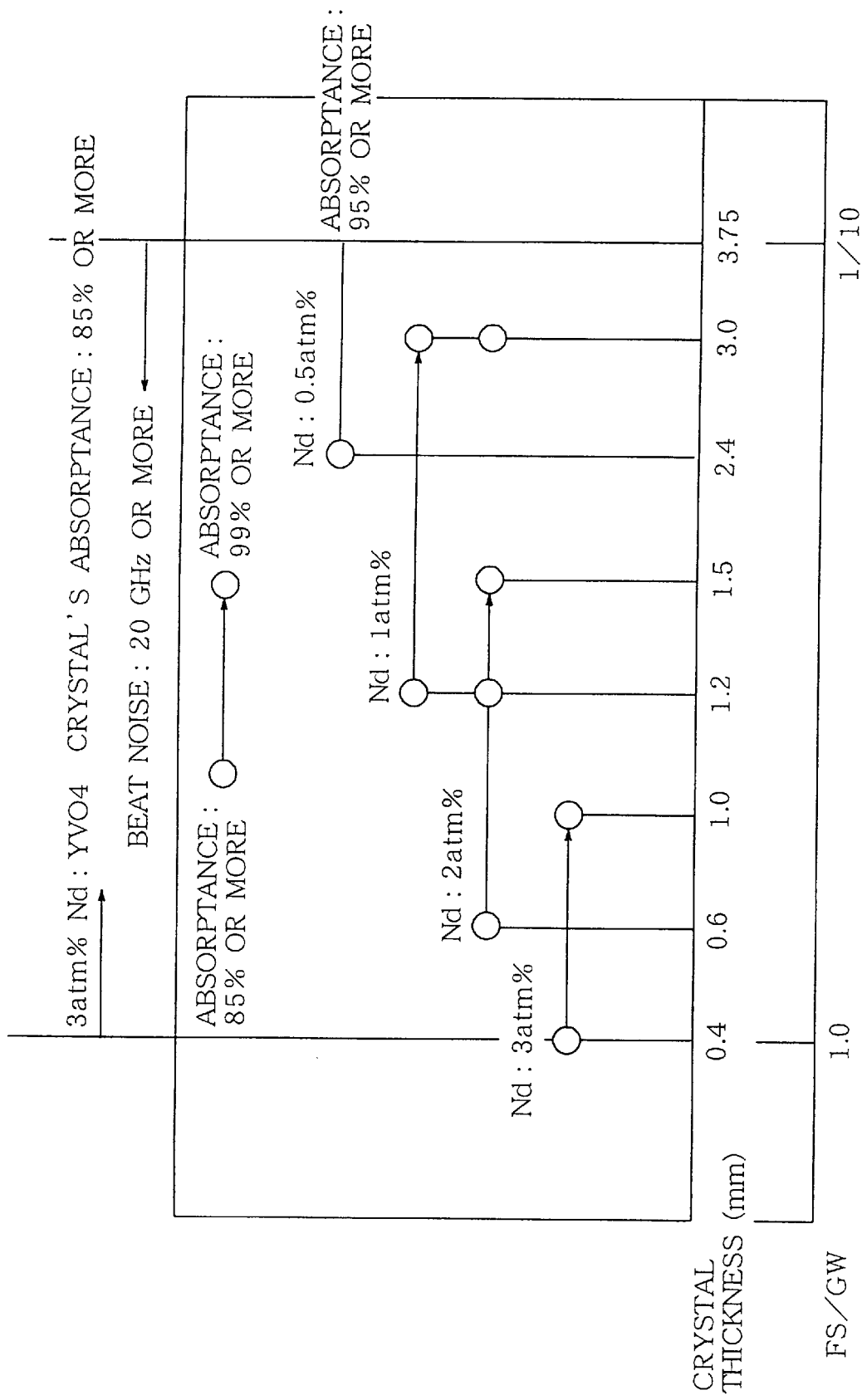
FIG. 3 is a graph indicating a relationship among an absorptance of absorbing a laser beam, Nd doping amount, a thickness of a solid laser medium, and FS/GW.

FIG. 3 is a graph indicating a relationship among an absorptance of absorbing a laser beam emitted from a laser-diode, an ND doping amount, a thickness of a solid laser medium, and FS/GW. For example, where an ND doping amount is 3 atm %, the absorptance of absorbing a laser beam from a laser-diode is 85% or more if a solid laser medium has a thickness of 0.4 mm (crystal thickness). However, under a same condition where an ND doping amount is 3 atm %, the absorptance of absorbing a laser beam from a laser-diode will be 99% or more if a solid laser beam has a thickness of 1.0 mm (crystal thickness). Further, when a solid laser medium has a thickness of 0.4 mm (crystal thickness), FS/GW is 1.0, whilst if a solid laser medium has a thickness of 3.75 mm (crystal thickness), FS/GW is 1/10.

As is understood from FIG. 3 and the above description, under a condition where an Nd doping amount remains unchanged, a thickness of a solid laser medium for obtaining a light absorptance of 99% is needed to be 2.5 times the thickness of a solid laser medium for obtaining a light absorptance of 85%.

Figure 4:
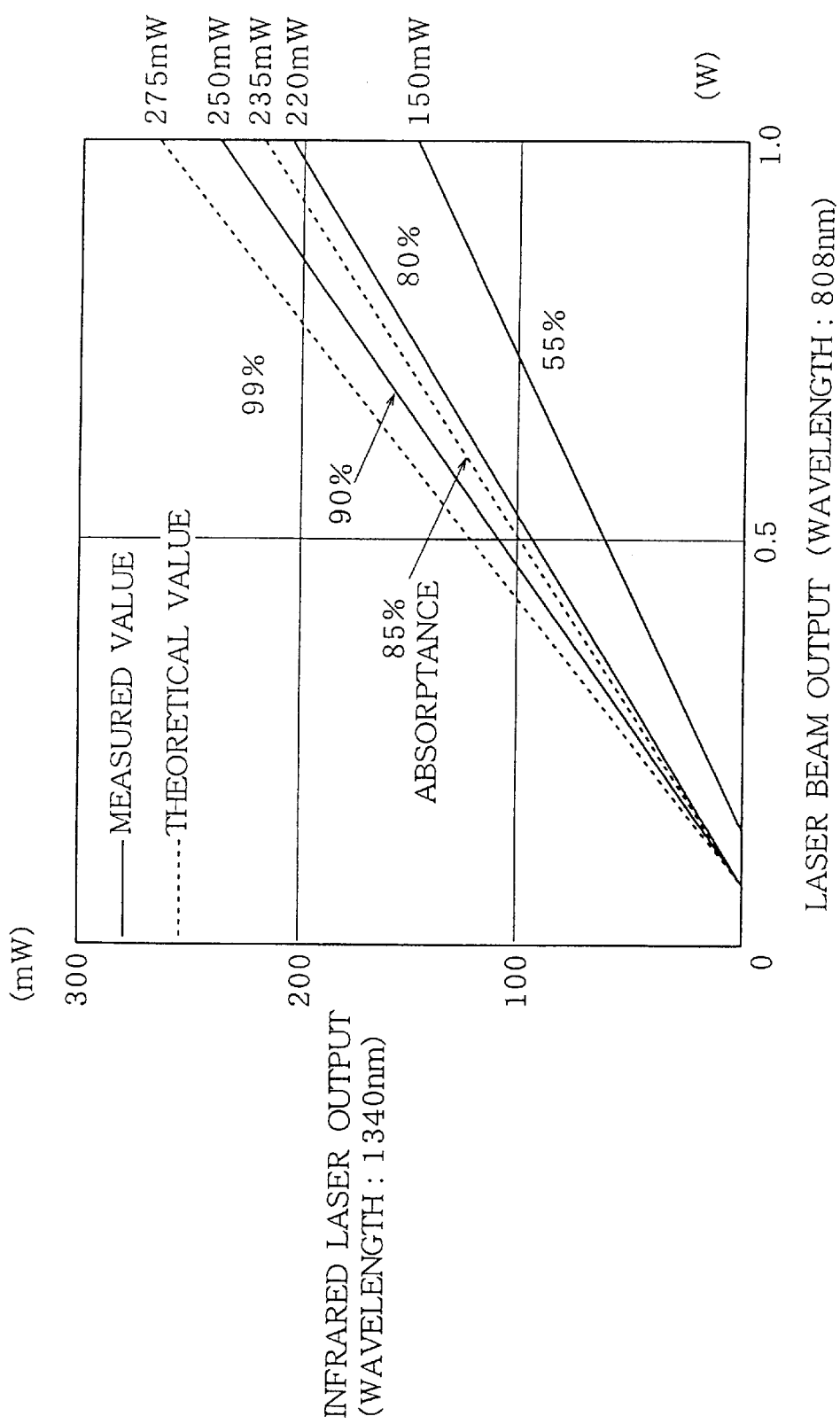
FIG. 4 is a graph indicating a relationship between an output of a laser beam and an output of an infrared laser beam, under various different light absorptances of absorbing a laser beam.

FIG. 4 is a graph indicating a relationship between a laser beam output from a laser-diode and an infrared laser output, under various different light absorptances of absorbing a laser beam. In FIG. 4, solid lines represent actually measured values and broken lines represent theoretical values.

Where a pair of mirrors R1 and R2 are arranged in parallel with each other on the both sides of a solid laser medium, it is preferred that the solid laser medium be made having a small thickness so as to obtain a high output of an infrared laser beam.

The equation $0.1 \leq FS/GW < 1$ is established in order to ensure a condition where there is only a low laser noise when a laser beam frequency is 2 GHz which is within the range of an actual communication frequency. A laser noise possible to occur near a frequency of 2 GHz is a beat noise occurring from resonator mode frequency intervals FS. Further, when a horizontal mode becomes a multi-mode of a low order, a noise will occur due to a longitudinal/horizontal resonance mode, resulting in a possibility that the frequency band of the noise will become close to a frequency that is 1/10 of the frequency of a beat noise.

Thus, it is necessary that the frequency band of a beat noise be set at 20 GHz or more. For this reason, it is also necessary that a resonator mode frequency interval FS be set at 20 GHz or more. In particular, it has been found from test results that the gain width GW of a Nd:$YVO_4$ crystal (when Nd doping amount is 1 atm %) is 200 GHz.

Therefore, in order to ensure a condition when a frequency is 2 GHz a laser noise is low, it is necessary that a relationship $0.1 \leq FS/GW$ be maintained. However, when $0.1 = FS/GW$, the number of longitudinal mode is 11 at most.

An Nd doping amount of a commercially available Nd:$YVO_4$ crystal is 0.5–3 atm %. In fact, the smaller the Nd doping amount, the lower the light absorptance of the crystal will be when a laser beam emitted from a laser-diode has a wavelength of 808 nm. In a case when an Nd doping amount is small, the light absorptance of the Nd:$YVO_4$ crystal may be increased by increasing the crystal thickness thereof. Consequently, the length of the resonator 1 will be increased, resulting in a narrow resonator mode frequency interval FS.

In view of a relationship among a light absorptance, an Nd doping amount and a solid laser medium thickness, when an Nd doping amount is 1 atm %, the thickness of a solid laser medium should be at least 3 mm if it is desired to obtain a light absorptance of 99%.

In the present invention, since a resonator length is determined in accordance with an equation $0.1 \leq FS/GW$ and has a value of 3.75 mm or less, it is possible to obtain a laser light absorptance of 99% even if an Nd doping amount is only 1 atm %. Further, with the use of the present invention, even if an Nd doping amount is 0.5 atm %. it is still possible to obtain a laser light absorptance of 95%.

On the other hand, an equation $FS/GW<1$ is determined in order to ensure a condition, in which when an Nd doping amount is 3% a laser light absorptance will be 85% or more and a solid laser medium may be made extremely thin in its thickness.

Where an output from a laser-diode is 1 W, and when a solid laser medium has a light absorptance of 85% or more for absorbing a laser beam emitted from the laser-diode, it is possible to obtain an infrared laser output of 230 mW or more. In this case, a rated output of the laser device may be set at 200 mW, which is sufficient for use in communication.

In accordance with a relationship among a light absorptance and an Nd doping amount and a solid laser medium thickness, if an Nd doping amount is 3 atm % and the thickness of a solid laser medium is 0.4 mm, the absorptance for absorbing a laser beam will be 85% or more. However, if a solid laser medium has a thickness of 0.4 mm, such kind of solid laser medium will be difficult to manufacture. For this reason, a resonator mode frequency interval FS should be set at approximately 190 GHz, almost the same as a gain width GF of Nd:YVO$_4$ crystal, thereby obtaining a condition $FS/GW<1$.

When the length of a resonator (i.e., the thickness of a solid laser medium) is selected such that a relationship between the gain width GW of a solid laser medium and a resonator mode frequency interval FS satisfies an equation $0.1 \leq FS/GW<1$, a light absorptance for absorbing a laser beam will be 85% or more, an infrared laser output (having a wavelength of 1340 nm) will be obtained with an efficiency of 23%. At this moment, a horizontal mode will become a mode of lower order which is lower than $TEM_{01}$.

Figure 5:
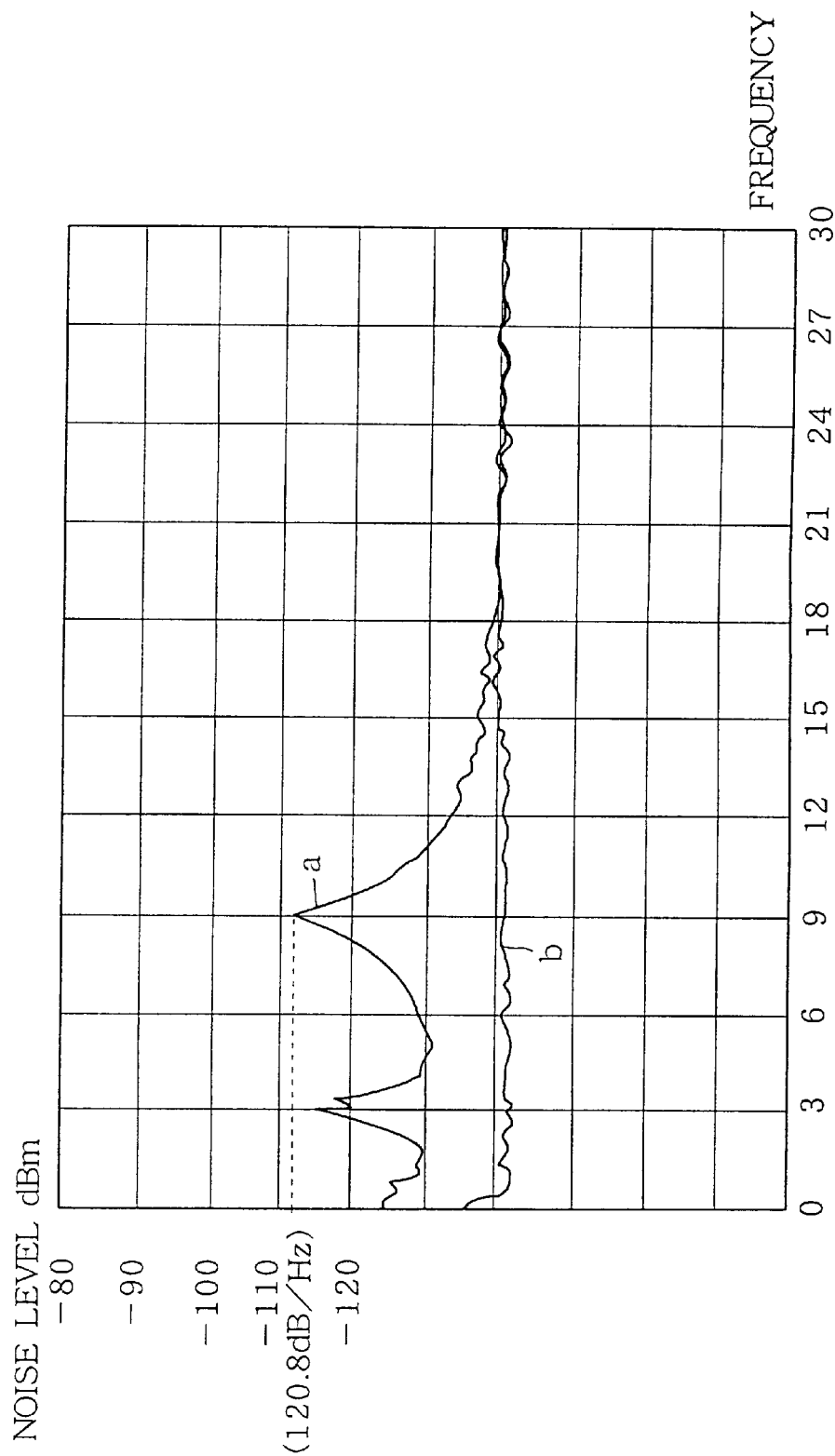
FIG. 5 is a graph indicating a noise characteristic of a laser beam.

When a laser beam frequency is 2 GHz or lower which is a practically usable frequency, a noise level will be –120 dB/Hz or lower, shown by curve a in FIG. 5. In FIG. 5, curve b indicates the signal level of a background noise.

Although it has been described in the above embodiment that Nd:YVO$_4$ crystal may be used as a solid laser medium, it is also possible to employ a Nd:YAG crystal to obtain a same effect.

However, if Nd:YAG crystal is employed, since a light absorptance of Nd:YAG crystal for absorbing a laser beam is only ⅓ of a Nd:YVO$_4$ crystal, it is necessary that the Nd:YAG crystal has a thickness which is 3 times as thick as Nd:YVO$_4$ crystal.

Figure 6:
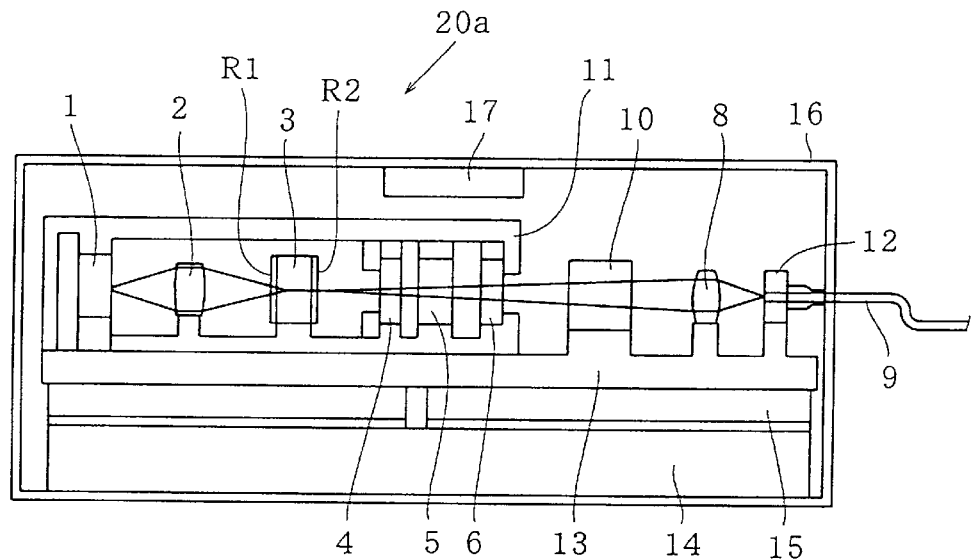
FIGS. 6a and 6b are explanatory views schematically indicating an optical system, in which the laser-diode-pumped solid state laser of FIG. 1 is used as a laser light source.
Figure 6:
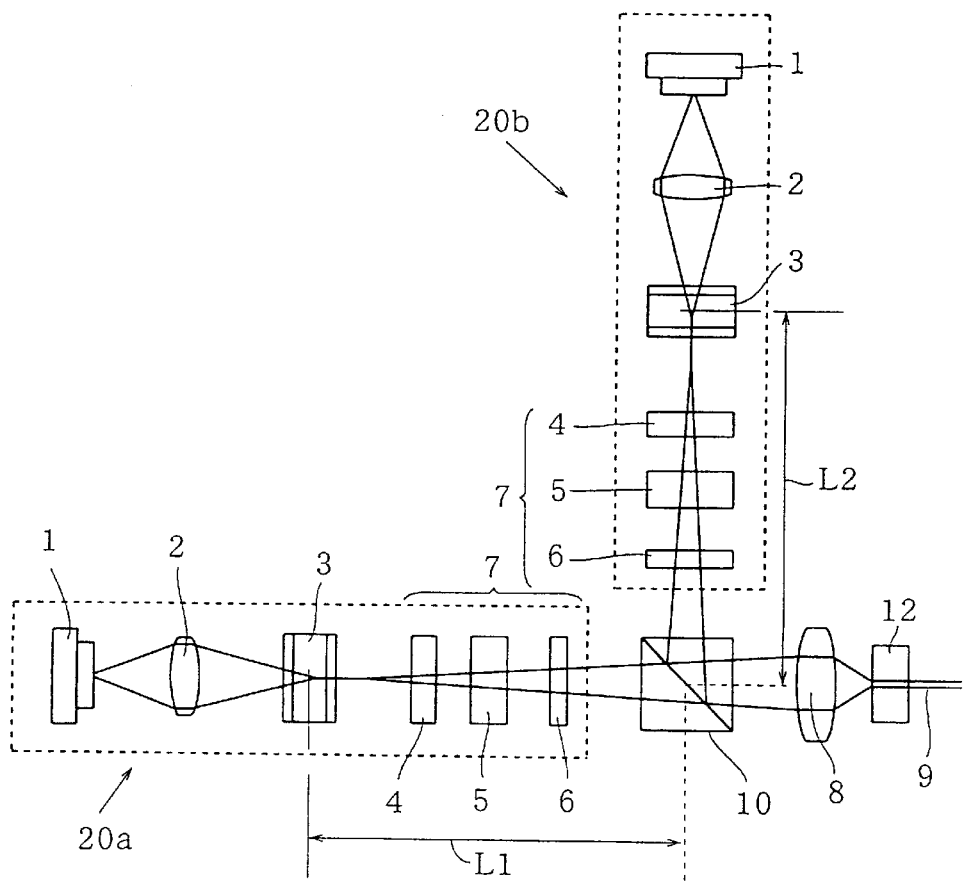

FIGS. 6a and 6b are explanatory views showing an optical system employing the above laser-diode-pumped solid statelaser as a laser light source.

FIG. 6a is a sectional view indicating a laser light source 20a, FIG. 6b is a plane view indicating a whole optical system according to the present invention.

Each of the laser light sources 20a and 20b comprises a laser-diode 1 capable of producing a laser beam having a wavelength of 808 nm, a converging lens 2 capable of converging a laser beam emitted from the laser-diode 1, a solid laser medium 3 including either YVO$_4$ crystal (yttrium vanadium oxide) containing Nd or YAG crystal (Yttrium Aluminium Garnet) containing Nd, a pair of mutually facing mirrors R1, R2 together forming a resonator for resonating an excited light excited by the solid laser medium 3, an optical isolator 7 including polarization elements 4 and 6 and a Faraday element 5. The laser light sources 20a and 20b are each capable of producing an infrared laser beam having a wavelength of 1340 nm.

The laser beams emitted from the laser light sources 20a and 20b have mutually orthogonal polarization planes, and are each passed through an optical isolator 7 so as to be directed to a beam splitter 10. In this way, the two laser beams are combined together and a combined laser beam is passed through a converging lens 8 and an optical fiber connector 12 so as to be directed to an optical fiber 9.

In the optical system shown in FIG. 6b, the two laser beams having mutually orthogonal polarization planes are combined together and further combined into the optical fiber 9. Thus, when a power being supplied to the optical fiber 9 is to be increased and a light beam having a predetermined polarization plane is to be obtained at the outlet of the optical fiber 9, a constant stabilized power may be obtained without depending upon an angle of polarization plane.

Where the two laser light sources 20a and 20b are the same as each other, a distance L1 between the beam waist of a laser beam of the first laser light source 20a and the beam splitter 10 before the laser beam is incident on the converging lens 8, is equal to a distance L2 between the beam waist of a laser beam of the second laser light source 20b and the beam splitter 10 before the laser beam is incident on the converging lens 8, thereby improving an efficiency for combining the laser beams to the optical fiber 9.

Referring to FIG. 6a, a laser-diode 1, a converging lens 2, a solid laser medium 3, a pair of mirrors R1, R2, and optical isolator 7 are enclosed within a case 11 which is made of a thermally conductive material and is formed on its output side with a window. In particular, a polarization element 6 of the optical isolator 7 may be used as a window of the case 11.

In this way, since the laser light sources 20a and 20b have been modularized, their replacement may be made easy. Further, since an optical film (such as a polarization element) having several refraction properties may be used as the window of the case 11, the number of necessary parts is reduced by one, thereby reducing an aberration in the optical system. On the other hand, if a wavelength plate is employed within the case 11, it is also possible that such wavelength plate may be used as the window of the case 11.

Referring again to FIG. 6a, in the optical system of the present invention, the laser light sources 20a, 20b, the beam splitter 10, the converging lens 8 and the optical fiber connector 12 are mounted on an identical support member 13 of a thermally conductive material, which is in turn fixed on a Pettier element 15 connected with a heat sink 14.

In fact, the laser-diodes 1, the converging lenses 2, the solid laser mediums 3, the mirrors R1, R2, and optical isolators 7, the beam splitter 10, the converging lens 8, the optical fiber connector 12, are all responsive to a temperature sensor (not shown) provided in the vicinity of each laser-diode 1 for producing a temperature detection signal. Further, a temperature control circuit (not shown) is provided to drive the Peltier element 15 so as to maintain all the above elements at a predetermined temperature.

Referring further to FIG. 6a, the laser-diodes 1, the converging lenses 2, solid laser mediums 3, a pair of mirrors R1, R2, and optical isolators 7, the beam splitter 10, the converging lens 8, the optical fiber connector 12, are all enclosed within a frame 16 which is sealed off. Moreover, a moisture absorbent 17 is provided within the frame 16 so that the inner space of the frame 16 may be kept at a low humidity to prevent a dew condensation.

With the use of the present invention, it is possible to provide an improved laser-diode-pumped solid state laser and an optical system using the same, which are capable of effectively absorbing a laser beam emitted from a laser-diode, and producing a stabilized infrared laser beam with a high efficiency.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. A laser-diode-pumped solid state laser, comprising:

a solid laser medium;

a laser-diode for producing a laser beam for exciting the solid laser medium and spaced apart from said solid laser medium;

a pair of mirrors sandwiching said solid laser medium and forming a resonator for resonating a light excited by the solid laser medium;

wherein an interval between the pair of mirrors is determined such that a gain width GW of the solid laser medium and a frequency interval FS (between every two resonator modes) satisfies an equation $0.1 \leq FS/GW \leq 1$.

2. A laser-diode-pumped solid state laser according to claim 1, wherein the pair of mirrors are formed by a pair of mutually facing reflective films disposed on both sides of the solid laser medium.

3. A laser-diode-pumped solid state laser according to claim 1, wherein the solid laser medium is $YVO_4$ crystal (yttrium vanadium oxide) containing Nd.

4. A laser-diode-pumped solid state laser according to claim 1, wherein the solid laser medium is YAG crystal (Yttrium Aluminium Garnet) containing Nd.

5. A laser-diode-pumped solid state laser according to claim 1, wherein the solid laser medium, the laser-diode and the pair of mirrors are mounted on an identical thermally conductive support means.

6. A laser-diode-pumped solid state laser according to claim 5, further including a temperature control device for controlling the temperature of the thermally conductive support means.

7. A laser-diode-pumped solid state laser according to claim 1, wherein the solid laser medium, the laser-diode and the pair of mirrors are enclosed within a case having a window formed on one side thereof, which side emitting a light beam excited by the solid laser medium.

8. A laser-diode-pumped solid state laser according to claim 7, wherein the case has polarization elements or wavelength plates provided adjacent to said window.

9. An optical system, comprising:

a first laser light source and a second laser light source for producing laser beams having mutually orthogonal polarization planes;

a beam splitter for synthesizing together the laser beams emitted from the first and second laser light sources and located near said first and second laser light sources;

an optical means located near said beam splitter and for converging a synthesized laser beam from the beam splitter and directing the same to an optical fiber;

wherein each of the first and second laser light sources is a laser-diode-pumped solid state laser including:

a solid laser medium;

a laser-diode for producing a laser beam for exciting the solid laser medium and spaced apart from said solid laser medium;

a pair of mirrors sandwiching said solid laser medium and forming a resonator for resonating a light excited by the solid laser medium;

wherein an interval between the pair of mirrors is determined such that a gain width GW of the solid laser medium and a frequency interval FS (between every two resonator modes) satisfies an equation $0.1 \leq FS/GW \leq 1$;

wherein a distance between the beam waist of a laser beam of the first laser light source and the beam splitter before the laser beam is incident on the converging lens, is equal to a distance between the beam waist of a laser beam of the second laser light source and the beam splitter before the laser beam is incident on the converging lens.

\* \* \* \* \*